United States Patent [19]

Christensen

[11] 3,831,170

[45] Aug. 20, 1974

[54] POSITION INDICATING APPARATUS AND DIGITAL CIRCUITRY FOR IT

[75] Inventor: Wynn L. Christensen, Yorba Linda, Calif.

[73] Assignee: Readx Inc., Garden Grove, Calif.

[22] Filed: Oct. 13, 1972

[21] Appl. No.: 297,403

[52] U.S. Cl. .................... 340/347 SY, 340/347 AD

[51] Int. Cl. ............................................ H03r 13/20

[58] Field of Search ............... 340/347 SY, 347 AD; 235/92 EV

[56] References Cited

UNITED STATES PATENTS 3,573,801 4/1971 Cohen .......................... 340/347 SY 3,586,836 6/1971 Paul ................................ 235/92 EV 3,670,324 6/1972 Trevor .......................... 340/347 SY

*Primary Examiner*—Charles E. Atkinson

*Assistant Examiner*—Vincent J. Sunderdick

*Attorney, Agent, or Firm*—Christie, Parker & Hale

[57] ABSTRACT

Indicating apparatus includes an incremental shaft position encoder having a shaft whose angular position is to be indicated. A multi-phase electrical signal developed by the encoder in response to rotation of the shaft is processed by digital circuitry to provide pulses suitable for counting by an up/down counter. The counter accumulates a count that represents the net rotation of the shaft.

8 Claims, 6 Drawing Figures

PATENTED AUG 20 1974 3,831,170

POSITION INDICATING APPARATUS AND DIGITAL CIRCUITRY FOR IT

CROSS-REFERENCE TO RELATED APPLICATION

My co-pending patent application Ser. No. 247,646, filed Apr. 26, 1972, entitled HEIGHT GAUGE, and assigned to the assignee of this invention, relates to height gauges and disclosed position indicating apparatus for them.

BACKGROUND OF THE INVENTION

This invention relates in general to position indicating apparatus and in particular to such apparatus having improved digital processing circuitry.

Position indicating apparatus have wide application in the field of instrumentation and control. By way of example, in height gauges, which are used to determine vertical dimensions of an object, it is convenient for the operator of the gauge to have before him a display indicator that informs him of the numerical value of the vertical dimension of the object. Accordingly, it is desirable to provide the gauge with a mechanical to electrical transducing device and processing circuitry responsive thereto to control a display such as a bank of numerical display lights.

In my above-referenced copending patent application, I disclose a height gauge that includes a shaft position encoder whose shaft is connected to rotate in one direction or the other in accordance with up or down translation of a slide arm mechanism in the gauge. I further disclose therein circuitry for reading out electrical indications provided by the encoder and for providing a numerical display of the relative position of the slide arm mechanism.

Because of its high accuracy and relatively low cost compared with other types of shaft position encoders, I prefer the type known as an incremental shaft position encoder. However, certain difficulties attend the use of incremental shaft position encoders. For one thing, the electrical output of the incremental type encoder does not provide information of significance while the shaft is stationary. Instead, a transition between binary values of either one of two signals that make up the encoder's multi-phase output signal indicates that the shaft has rotated from one position to another. Thus, in order to obtain significant information about the existing shaft position, it is necessary to detect, count up, and then remember how many transitions have occurred. Also, simply counting the number of transitions does not provide information about the direction, clockwise or counterclockwise, in which the shaft is rotating. Instead, since the multi-phase output has one phase when the shaft rotates clockwise and another, opposite phase when the shaft rotates counterclockwise, it is necessary to provide phase detecting circuitry which controls the counter so that it counts up or down depending upon the direction of shaft rotation.

In a conventional approach, the transitions between binary values of the two signals are detected by resistor-capacitor differentiating networks and tandem diode gating arrangements. These conventional arrangements suffer from the disadvantages of complexity, difficulty in micro-miniaturizing because of the resistor-capacitor networks, and importantly, noise sensitivity. The noise sensitivity of these conventional arrangements generally leads to spurious counts being accumulated in the counter register so that its total count does not accurately reflect the true position of the shaft.

SUMMARY OF THE INVENTION

The present invention provides digital circuitry for detecting transitions in binary values and forming pulses indicative of detection. A feature of the circuitry is that resistor-capacitor differenting networks are not necessary in its implementation, and, accordingly, the circuitry is relatively simple and suitable for micro-miniaturized packaging in integrated circuit components. A further, important feature is that the digital circuitry of this invention provides improved noise immunity in detecting transitions between binary values of the individual data signals of a parallel, multi-phase signal such as the position indicating signal provided by an incremental shaft position encoder.

Broadly, apparatus for forming pulses in accordance with this invention includes a source of two time-varying binary-valued data signals that each switch back-and-forth between binary opposite values. (That is, each data signal has transitions between a first binary value called "0" and a second, opposite binary value called "1"). A pair of bistable circuits are provided, each primarily associated with a respective one of the data signals. Each bistable circuit has an output for providing a control signal and an input for receiving a trigger signal. The control signal of each bistable circuit switches back-and-forth in accordance with but no sooner than a predetermined delay after the switching of its associated data signal. A separate pair of control signals are produced that individually indicate whether or not a respective one of the bistable circuit control signals has switched in accordance with the associated data signal. Separate gating means are provided for forming pulses as trigger signals to the two bistable circuits. In combination, the gating means form a pulse each time either data signal switches at a time when the other data signal does not.

As embodied in position indicating apparatus, this invention includes an incremental shaft position encoder. A multi-phase signal, provided by the encoder, includes two data signals that each switch back-and-forth between binary values in response to rotation of the shaft of the encoder. The phase of the multi-phase signal indicates which direction the shaft is being rotated toward. Transition detection means are provided which include bistable and gating circuits arranged to detect transitions between binary values of the data signals and form a pulse each time either data signal switches at a time that the other data signal does not. Phase detecting means detect and indicate which phase the multi-phase signal is in. And, means including an up/down counting register responsive to the transition and phase detecting means accumulate a count of the pulses formed so that the accumulated countrepresents the net rotation of the shaft.

DETAILED DESCRIPTION

Figure 1:
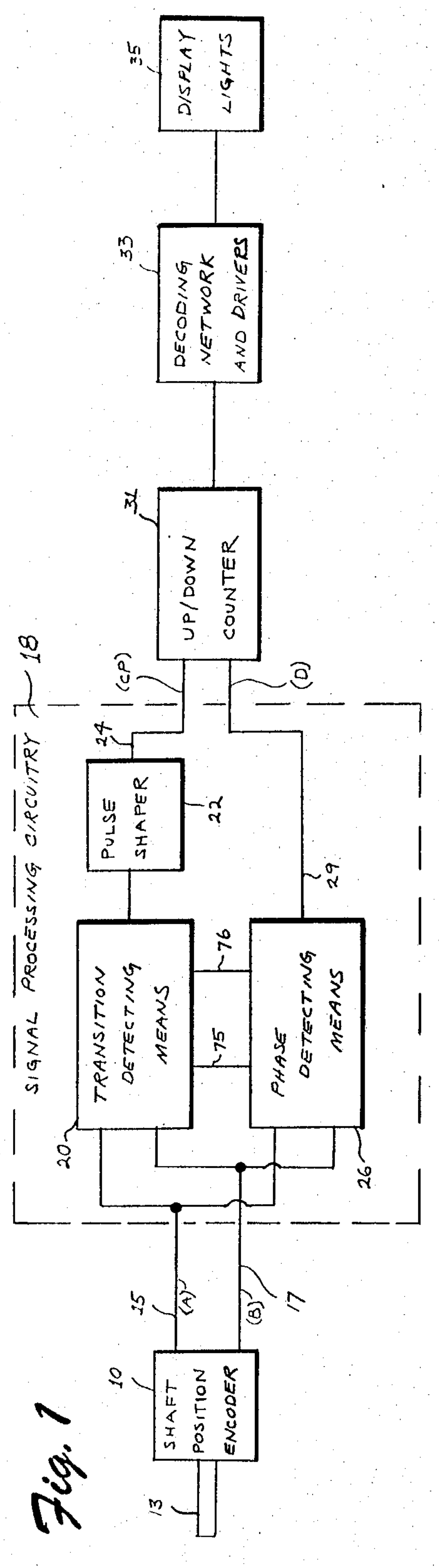
FIG. 1 is a block diagram illustrating the general arrangement of position indicating apparatus embodying this invention.

The position indicating apparatus of FIG. 1 includes a conventional shaft position encoder 10 having a shaft 13. The encoder is of the type known as incremental encoder. In a typical application, the shaft is mechanically connected to a movable member in a machine so that the amount of rotation of the shaft corresponds directly to the amount of movement of the movable member. For example, in the height gauge described in my above referenced patent application, the shaft is connected by a gear to a slide arm mechanism so that as a slider arm goes up, the shaft rotates in one direction, say clockwise, and as the slide arm moves down, the shaft rotates in the opposite direction.

The encoder provides on signal leads 15 and 17 a two-phase indication comprising binary valued signals A and B. Each binary valued signal has a logical "1" value and a logical "0" value. By way of example, plus 5.0 volts or thereabout may represent a "1" and 0 volts or thereabouts may represent a "0."

While the shaft 13 is stationary, the signals A and B are in one of four static conditions. These four static conditions are: A and B each equals 1, only A equals 1, only B equals 1, and neither A nor B equals 1.

The static conditions of the signals do not provide information of significance. However, a transition between binary values in either one of these signals indicates that the shaft has rotated from one position to another.

Figure 2:
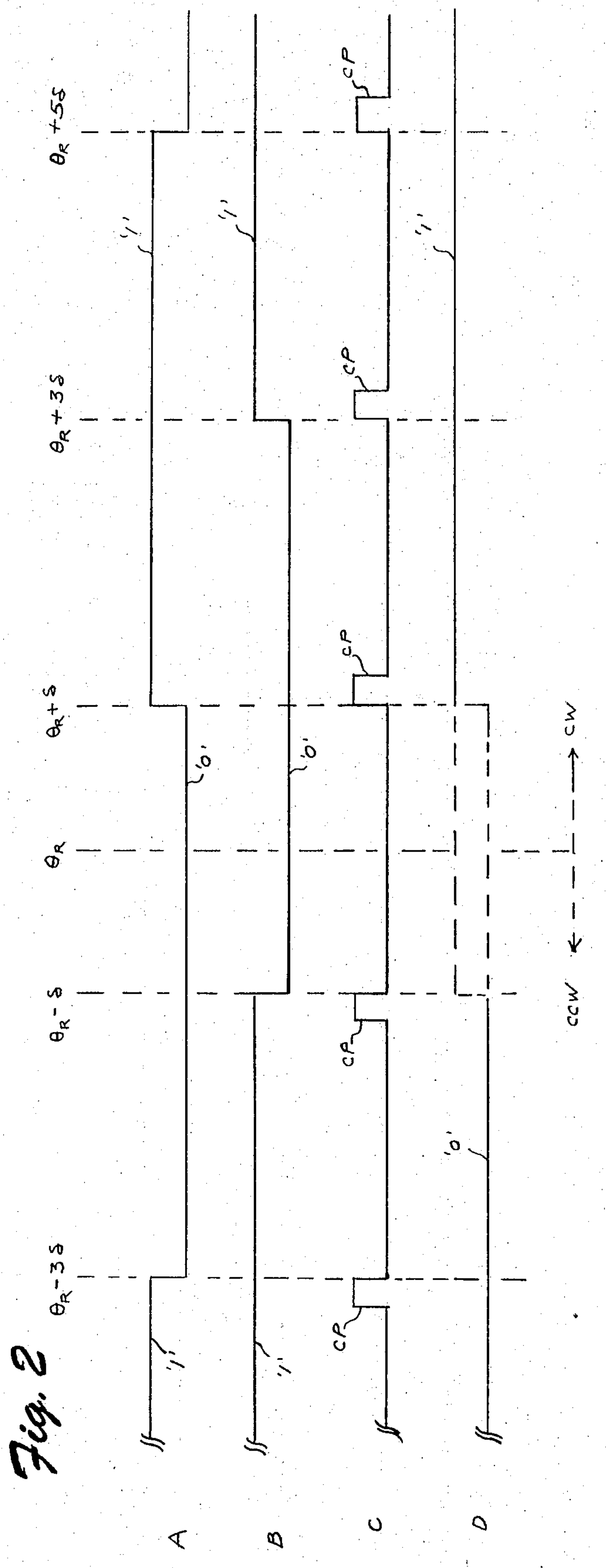
FIG. 2 is a waveform diagram showing the general characteristics of a parallel, multi-phase indicating signal, produced by the shaft position encoder.

Consider now the waveform diagrams of FIG. 2. As indicated, at an angle $\theta_R$, the A and B signals each equals 0. The angle $\theta_R$ is an arbitrary one of a multiplicity of angles each of which is midway between an angle wherein the A signal switches and an angle wherein the B signal switches. When the shaft rotates to an angle $\theta_R$ plus δ, the A signal switches from 0 to 1 while the B signal remains 0. A further rotation in the same direction to an angle $\theta_R$ plug 3 causes the B signal to switch from 0 to 1. On the other hand, when the shaft rotates from $\theta_R$ to $\theta_R$ minus δ, the B signal switches from 0 to 1 while the A signal remains 0. A further rotation in the same direction to an angle θ minus 3 δ causes the A signal to switch from 0 to 1. The magnitude of the angle δ is determined by the construction of an optically encoded disk (not shown) in the encoder. In one specific commercially available encoder, this angle is about 0.045°.

As the waveforms indicate, when the shaft rotates in one direction, either the B signal switches to assume the same binary value as the A signal, or the A signal switches to assume the opposite binary value from the B signal. On the other hand, when the shaft rotates in the opposite direction, either the A signal switches to assume the same binary value as the B signal or the B signal switches to assume the opposite binary value from the A signal.

Signal processing circuitry 18 receives the A and B signals via the signal leads 15 and 17. The signal processing circuitry includes in tandem connection transition detecting means 20 and pulse shaper 22 (which are described in detail below) which cooop erate to generate on signal lead 24 a pulse train of pulses CP. As indicated in FIG. 2, a pulse CP is generated in response to each of the transitions between binary values of the A and B signals.

Phase detecting and indicating means 26 (described in greater detail below) in the signal processing circuitry also receives the A and B signals via the signal leads 15 and 17. The phase detecting means 26 produces on a signal lead 29 a binary-valued signal D, the value of which indicates whether each transition is the result of clockwise or counterclockwise rotation of the shaft. As indicated in FIG. 2, signal D has a 1 value to the right of the transition at $\theta_R$ plus δ. Thus, as the shaft rotates clockwise away from $\theta_R$, the D signal has a 1 value for the angles past $\theta_R$ plus δ. On the other hand, as indicated in FIG. 2, the D signal has a 0 value to the left of the transition at θ minus δ. Thus, as the shaft rotates counterclockwise away from $\theta_R$, the D signal has a 0 value for the angles past $\theta_R$ minus δ. The horizontal dashed lines in FIG. 2 are intended to indicate that while the shaft is stationary the D signal can have either binary value. Thus, in circumstances wherein the shaft rotates clockwise through 1 or more transitions and stops at a position between $\theta_R$ minus δ and $\theta_R$ plus δ, the D signal has a 1 value during such rotation and continues to have the same 1 value while the shaft is stationary. If, after stopping, the shaft should reverse direction, the D signal switches to 0 when the shaft reaches $\theta_R$ minus δ. On the other hand, in circumstances wherein the shaft rotates counterclockwise through one or more transitions and then stops at a position between $\theta_R$ minus δ and $\theta_R$ plus δ, the D signal has a 0 value during such rotation and continues to have the same 0 value while the shaft remains stationary. If, after stopping, the shaft should reverse direction, the D signal switches to 1 when the shaft reaches $\theta_R$ plus δ.

A conventional up/down counter register 31 receives the CP pulses via the signal lead 24 and receives the D signal via the signal lead 29. While the D signal equals 1, each CP pulse increments the counter. While the D signal equals 0, each CP pulse decrements the counter. By virtue of a delay introduced by means 20 and the pulse shaper 22, it is assured that the first CP pulse formed when the shaft starts to rotate from a stationary position will arrive after the D signal has switched to the proper value to control the counter. Accordingly, the up/down counter accumulates a count that is a digital indication of the net rotation of the shaft with respect to a reference position. A conventional gating network 33 decodes the count in the counter register 31 and provides signals to numerical display lights 35 which preferably are mounted in a display panel or box for easy visibility.

Figure 3:
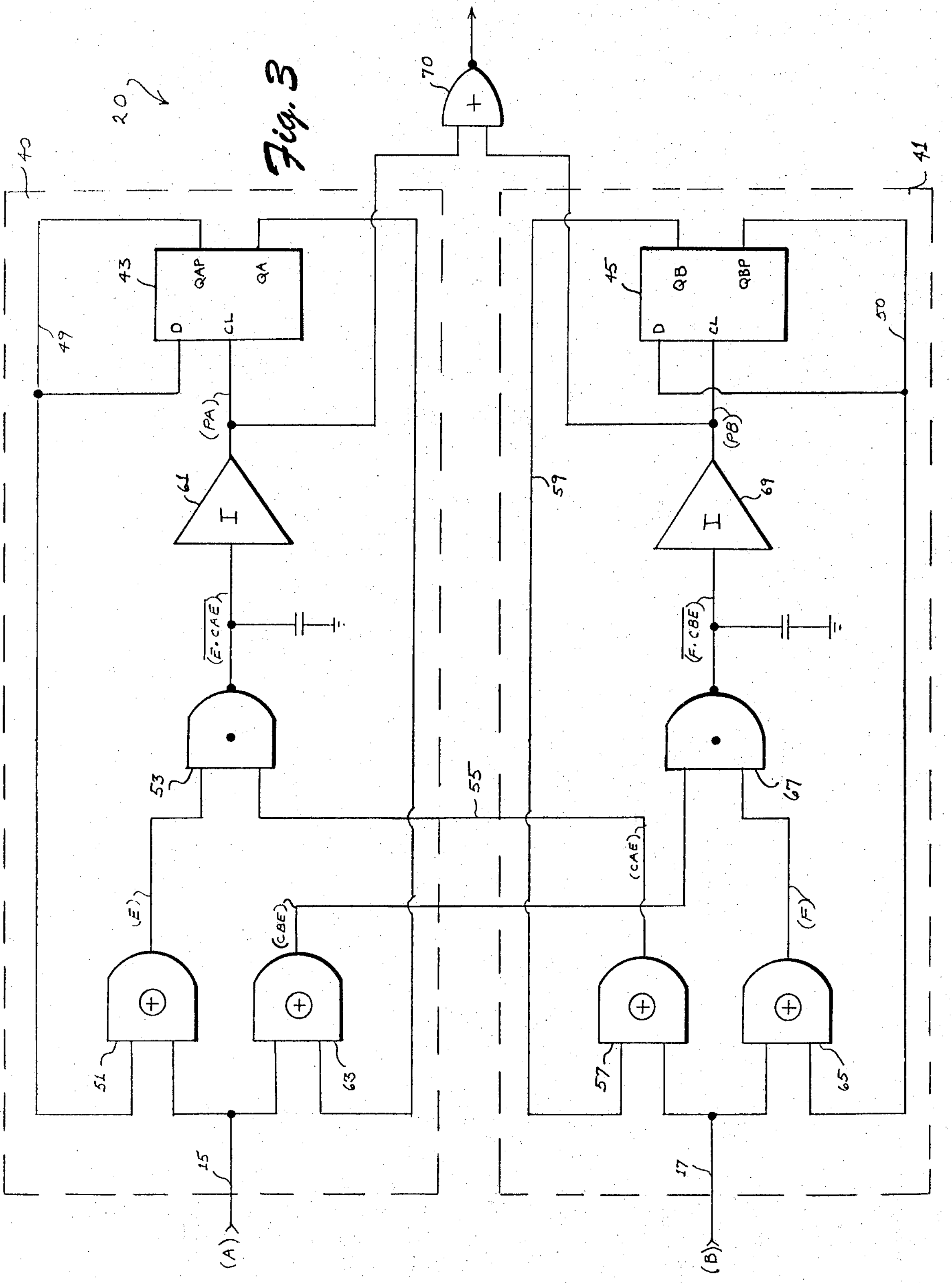
FIG. 3 is a logic block diagram of the preferred embodiment of the transition detecting means in the signal processing circuitry of FIG. 1.

As shown in greater detail in FIG. 3, the transition detecting means 20 includes two identical pulse forming networks 40 and 41. Each pulse forming network includes a bistable circuit (43 in network 40 and 45 in network 41) that is triggerable to switch between opposite states. Preferably, each bistable circuit is of the type known as a D type flip-flop. Such a flip-flop has a D input for receiving a control signal, a clock input (CL) for receiving a trigger signal and an output on which it provides preferably two, complementary binary-valued signals. The complementary signals produced by bistable circuits 43 and 45 are identified as QA and QAP and QB and QBP respectively. In one state, taking bistable circuit 43 by way of example, the QA signal has a 1 value whereas the QAP signal has a 0 value. In the other state, the values assumed by QA and QAP are reversed. In operation, again taking bistable circuit 43 by way of example, when the control signal applied to its D input has a 1 value at a time when a 0 to 1 transition occurs in the trigger signal applied to its CL input, the response of the bistable circuit is as follows. If binary value of the QA signal is 0, then the bistable circuit switches states so that the QA signal switches its binary value to 1. If the binary value of the QA signal is 1, then it remains so following the transition in the trigger signal. On the other hand, when the control signal applied to the D input has a 0 value at a time when a 0 to 1 transition occurs in the trigger signal the response of the bistable circuit is as follows. If the binary value of the QA signal is 1, then the bistable circuit switches states so that the QA signal switches its binary value to 0. If the binary value of the QA signal is 0, then it remains so following the transition in the trigger signal.

The QAP signal is fed back by a signal lead 49 as a control signal to the D input of the bistable circuit 43. Likewise, the QBP signal is fed back by a signal lead 50 as a control signal to the D input of the bistable circuit 45. By this arrangement, the response of each of the bistable circuits to a sequence of pulses applied to its CL input is to toggle back and forth between states.

The QAP signal is also fed back by the signal lead 49 to one input of the two-input exclusive-OR gate 51. The other input of the exclusive-OR gate 51 is connected by signal lead 15 to receive the A signal from the shaft position encoder 10 (FIG. 1). The exclusive-OR gate 51 has an output on which it produces an E signal. A Boolean equation relating the binary value of the E signal to the binary values of the A and QAP signals is as follows.

$$E=\overline{A}\cdot QAP+A\cdot\overline{QAP}$$

In other words, the binary value of the E signal is 1 when the binary values of the A and QAP signals are opposite from each other and is 0 otherwise. Moreover, because the QAP signal has the opposite binary value from the QA signal, it follows that the binary value of the E signal is 1 when the QA signal has the same binary value as the A signal and is 0 otherwise. For brevity of description, hereinafter, the expression QA is a copy of A will be used to mean that the A and QA signals have the same binary value. Using this terminology then, the binary value of the E signal is 1 when QA is a copy of A and is 0 when QA is not a copy of A. Equivalently, it can be said that the binary value of the E signal is 0 when QAP is a copy of A and is 1 when QAP is not a copy of A.

The E signal is applied to one input of a two-input NAND gate 53. The other input of NAND gate 53 is connected by a signal lead 55 to the output of an exclusive OR gate 57 in pulse forming network 41. The exclusive-OR gate 57 has one input connected by signal lead 17 to the shaft position encoder 10 (FIG. 1) to receive the B signal and has another input connected by a signal lead 59 to receive the QB signal from bistable circuit 45.

A control signal CAE is produced by exclusive-OR gate 57 and carried by the signal lead 55. A Boolean equation relating the binary value of the CAE signal to the binary values of the B and QB signals is as follows.

$$CAE=B\cdot\overline{QB}+\overline{B}\cdot QB$$

Thus, the binary value of the CAE signal is 1 when the QB signal is not a copy of B signal and is 0 otherwise.

An inverter gate 61 has its input connected to the output of NAND gate 53 and has its output connected to the CL input of bistable circuit 43. By virtue of the tandem connection between them, NAND gate 53 and inverter 61 implement the same logical gating function as a simple two-input AND gate. A signal PA produced by inverter 61 serves as a trigger signal for the bistable circuit 43. A Boolean equation relating the binary value of the signal PA to the binary values of the signals A, QA, B, and QB is as follows:

$$PA=(A\cdot\overline{QAP}+\overline{A}\cdot QAP)\cdot(B\cdot\overline{QB}+\overline{B}\cdot QB)$$

Thus, the binary value of the PA signal is 1 when, at the same time, QAP is not a copy of A and QBP is a copy of B.

Figure 6:
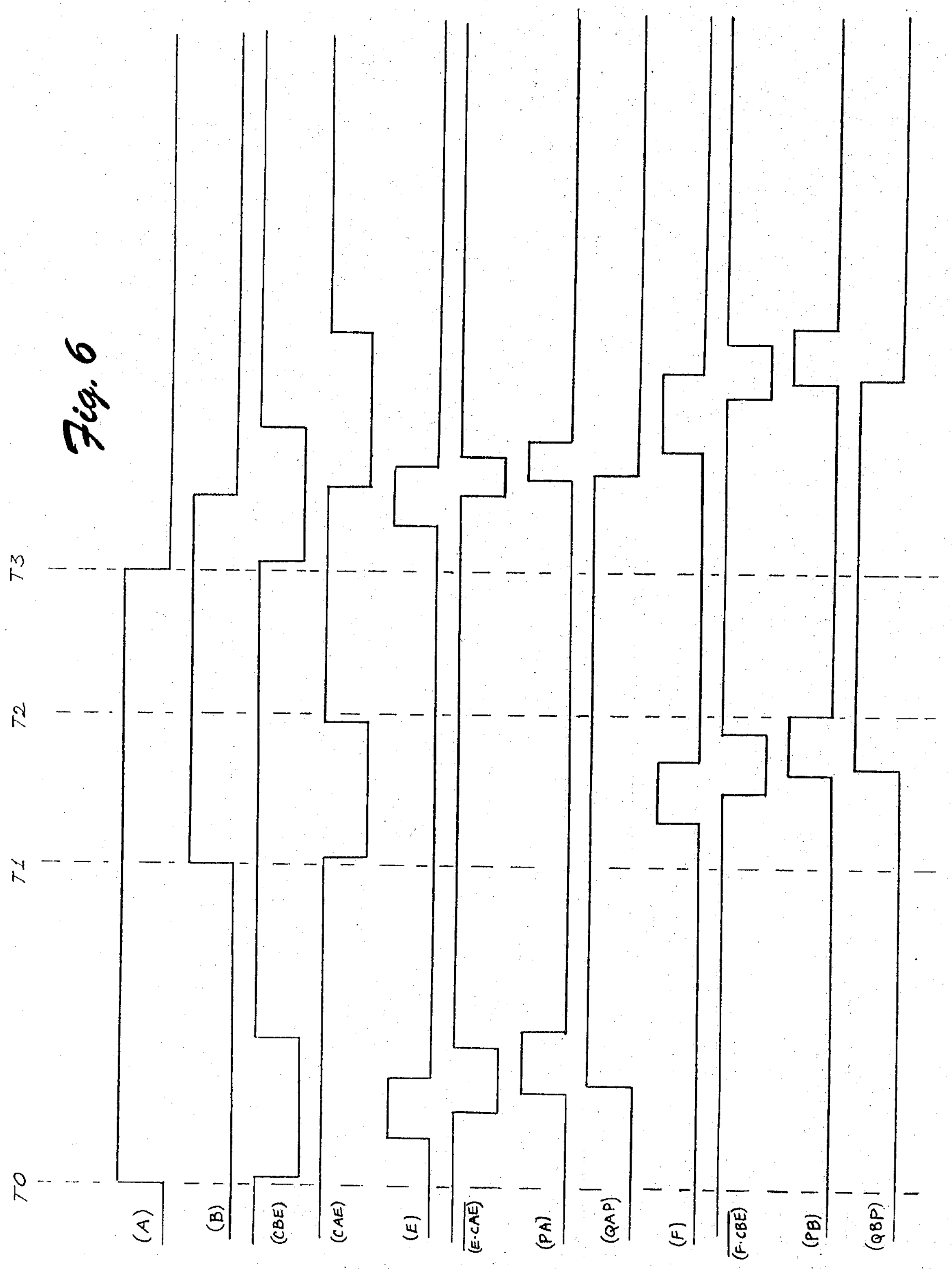
FIG. 6 is a timing diagram showing particular details in an example of operation of the transition detecting means.

With reference to FIG. 6, which is an exemplary timing diagram, a more detailed description of the operation of the pulse forming networks 40 and 41 will now be given. For an indefinite period of time preceding a time TO, the binary value of each of the A and B signals is 0. During this period of time the QAP signal is a copy of the A signal, and the QBP signal is a copy of the B signal. Accordingly, the signal CAE has a binary value of 1. Likewise, because the QBP signal is a copy of the B signal, a signal CBE, produced by an exclusive-OR gate 63 (which is the portion of network 40 corresponding to the above-described exclusive-OR gate 57 in network 41), has a binary value of 1. Moreover, because the QAP signal is a copy of the A signal, the E signal has a binary value of 0. Likewise, because the QBP QB signal is a copy of the B signal, an F signal, produced by an exclusive-OR gate 65 (which is the portion of network 41 corresponding to the above described exclusive-OR gate 51 in network 40), has a binary value of 0. Because the E signal is 0, NAND gate 53 produces a 1 binary value CAE). $\overline{E\cdot CAE}$), Likewise, because the F signal is 0, the corresponding NAND gate 67 in network 41 produces a 1 binary value (see $\overline{F\cdot CBE}$). Inverter 61 inverts the output signal of NAND gate 53 and, accordingly, the PA signal has a binary value of 0. Likewise, the corresponding inverter 69 in network 41 inverts the output signal of NAND gate 67 and, accordingly, the binary value of the signal it produces, PB, has a binary value of 0.

In this example, at a time TO, the binary value of the A signal switches from 0 to 1 while the binary value of the B signal remains static at 0. As will be explained below, while bistable circuit 43 will, as a result of the transition in binary value of the A signal, switch states, this occurs after a predetermined delay: For this reason, under the switching of the A signal, the QAP signal, for a transition period, is not a copy of the A signal. Accordingly, the binary value of the CBE signal, produced by exclusive-OR gate 63, switches from 1 to 0. This switching from 1 to 0 takes a relatively brief period of time, commonly called "fall time." For example, in a specific embodiment where the exclusive-OR gates are of the type identified in the trade as Ser. No. 7486 (such types are sold by the Texas Instruments Company, among others), the fall time is about 3 nanoseconds (ns.). An advantageous feature of this type of exclusive-OR gate is that the amount of time it consumes in switching the binary value of its output signal from 0 to 1, commonly called "rise time," is relatively large compared to its fall time. Typically, the rise time is about 15 ns., which is about a factor of 5 times its nominal fall time of 3 ns. Accordingly, the binary value of the E signal, produced by exclusive-OR gate 51, switches from 0 to 1 about 15 ns. after TO. Because the B signal has not switched its binary value, the QBP signal remains a copy of the B signal and, accordingly, the binary value of the CAE signal remains 1. NAND gate 53 receives the CAE signal and is enabled by the 1 value thereof to respond to a 0 to 1 transition in the binary value of the E signal to switch the binary value of its output signal ($\overline{E \cdot CAE}$) from 1 to 0. This switching also takes a relatively brief period of time. In the specific embodiment where the NAND gate is of the type identified in the trade as Ser. No. 7400 (also sold by Texas Instruments Company) and is loaded as shown in FIG. 3 by a capacitor, the fall time (and also the rise time) is about 10 ns. Inverter 61 responds to this 0 binary value of its input signal to switch the binary value of its output signal, PA, from 0 to 1. Inverter 61 is implemented in the specific embodiment by an Ser. No. 7400, but because it is not loaded by a capacitor, has a rise time of about 5 ns. In response to the 0 to 1 transition in the binary value of the PA signal, applied to its CL input, and under the control of the QAP signal applied to its D input, bistable circuit 43 switches states. In the specific embodiment, the bistable circuit 43 is implemented by an Ser. No. 7474 (also sold by Texas Instruments Company). From the foregoing it can be seen that the QAP signal becomes a copy of the A signal, but no sooner than about 32 ns. after the switching between binary values of the A signal. With the QAP signal becoming a copy of the A signal, after its fall time delay, exclusive-OR gate 51 switches the binary value of its output signal E from 1 to 0. The response, and after the propagation delays, the $\overline{E \cdot CAE}$ and the PA signals switch from 0 to 1 and from 1 to 0 respectively. The completion of the response to the switching from 1 to 0 in the binary value of the A signal is the return of the CBE signal from 0 to 1. From the foregoing, it can be seen that the CBE signal, while it has a binary value of 0, indicates that a gating control signal (i.e., QA and QAP in combination), produced by bistable circuit 43, has not switched in accordance with a data signal (i.e., the A signal). Moreover, while the CBE signal has a binary value of 1, it indicates that this gating control signal has so switched. By the symmetry of the circuitry, it can be seen that the CAE signal provides the same information with respect to pulse forming network 41.

The response of pulse forming network 41 to a transition in the B signal is identical to the above-described response of pulse forming network 40 to a transition in the A signal. This is is illustrated in FIG. 6 by the actions taking place between the times marked T1 to T2.

Consider now the response to a somewhat atypical occurrence, also illustrated in FIG. 6, wherein the A and B signals again switch in binary values at different times, but within a far shorter period of time. As indicated at T3, the A signal switches in binary value from 1 to 0, and shortly thereafter, say about 25 ns., the B signal switches in binary value from 1 to 0.

As can be seen from FIG. 6, the response of pulse forming network 40 is substantially the same as has been described above, with the only difference being that pulses formed are of somewhat different duration. However, the response of pulse forming network 41 is different in that the formation of the pulse in the PB signal is delayed somewhat. This is due to the disabling action of the 0 value of the CBE signal. That is, so long as the CBE signal has a binary value of 0, and it has this value until QAP has become a copy of A, NAND gate 67 is disabled from responding to the transition in the binary value of the F signal. The effect of this delay in response is to insure that there is a minimum, predetermined period of time between the pulses formed in the PA and PB signals even though less than this minimum period of time transpires between the switching of the binary values of the A and B signals.

This is an important feature because, with the time separation between them, the PA and PB signals can be combined, as by a NOR gate 70 (FIG. 3) and yet the pulses are distinguishable from each other. Absent this feature, of course, the pulses could overlap in time, in which case the output signal waveform of NOR gate 70 would have one long pulse instead of the desired two time spaced-apart pulses.

An additional feature resides in the noise rejecting capability of the transition detecting means. In this feature, noise that causes simultaneous switching of the A and B signals does not result in a pulse in either the PA or PB waveforms. This is due to the cross-coupling of the CAE and CBE signals that, when such simultaneous switching occurs, each inhibit a respective one of the pulse forming networks from detecting and indicating the occurrence of a transition.

The output of NOR gate 70 is connected to drive the pulse shaper 22 (FIG. 1) which in turn forms the pulse train of pulses CP that are counted by the counter register 31 (FIG. 1). The circuitry for the pulse shaper, the counter register, the decoding network 33 and the display lights are each conventional. Many well-known arrangements can be used to implement these parts of the position indicating apparatus.

Figure 4:
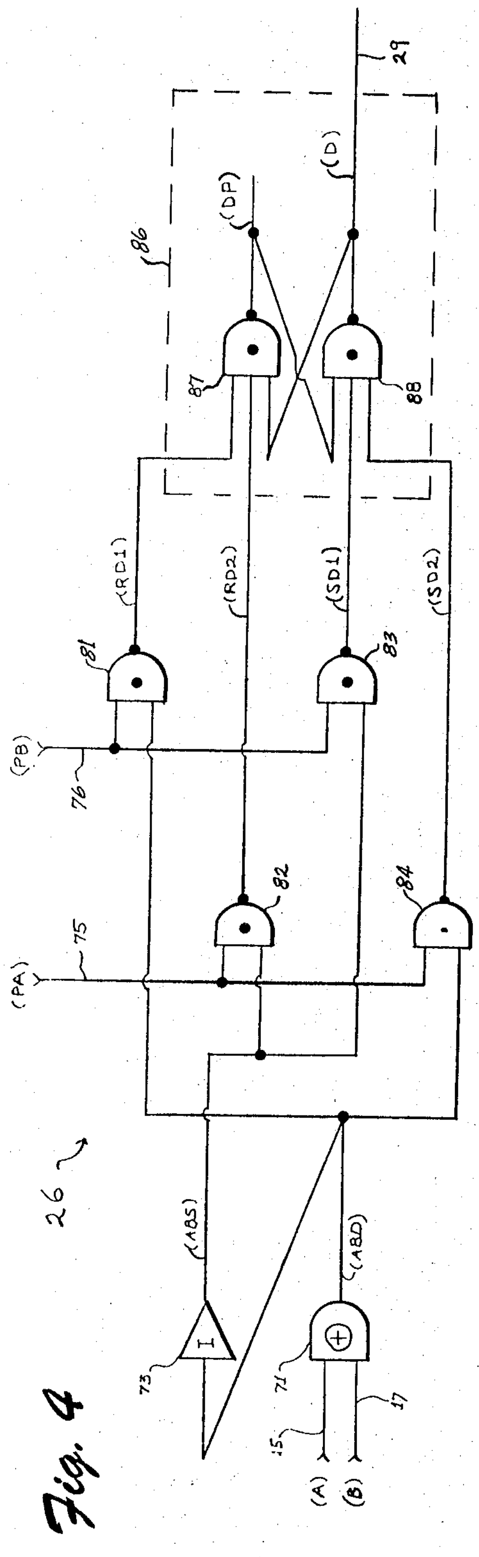
FIG. 4 is a logic block diagram of the preferred embodiment of other portions of the signal processing circuitry of FIG. 1.

With reference now to FIG. 4, the construction of other portions of the signal processing circuitry 18 will now be described.

The phase detecting means 26 includes an exclusive-OR gate 71 having two inputs that are connected by the signal leads 15 and 17 to receive the A and B signals respectively. Exclusive-OR gate 71 has an output on which it produces a signal ABD which has a binary value of 1 while the binary values of the A and B signals are different and which has a binary value of 0 otherwise. An inverter 73 inverts the ABD signal to produce a signal ABS which has a binary value of 1 while the binary values of A and B signals are the same.

Phase detecting means 26 is connected by signal leads 75 and 76 to transition detecting means 20 (FIG. 3) to receive the PA and PB signals respectively. Four NAND gates 81, 82, 83, 84 are, in combination, responsive to the ABD, ABS, PA, and PB signals to control the state of a latch circuit 86. A pair of NAND gates 87 and 88 are arranged in the conventional cross-coupled arrangement to form the latch circuit. The output signal provided by the latch circuit, taken from NAND gate 88, in the D signal, described above with reference to FIG. 2, which controls whether the counter register (FIG. 1) counts up or down.

As illustrated in the timing diagram of FIG. 5, the operation of phase detecting means 26 in responding to an exemplary sequence of events is as follows.

In this example, the shaft 13 (FIG. 1) rotates clockwise, stops, and then reverses direction to rotate counter-clockwise. The timing pattern of the multi-phase signal comprising A and B signals for this example is shown at the top of FIG. 5. While the shaft rotates clockwise, the A signal leads the B signal in phase, whereas while the shaft rotates counterclockwise, the A signal lags the B signal in phase.

From the foregoing description of transition detecting means 20 it will be recalled that the PA signal has a pulse train wave form. Each pulse occurs in response to a transition in the A signal, with the leading edge of the pulse being delayed in time from the transition. This is also true of the PB signal with respect to the B signal.

The switching response of gates 71 to 73, while introducing some delay, is such that the ABD and ABS signal respectively have assumed their appropriate binary values by the time the pulses are formed. Thus, as shown in FIG. 5, whle the shaft rotates clockwise, each pulse in the PA waveform occurs while the ABD signal has a binary value of 1. And, each pulse in the PB waveform occurs while the ABS signal has a binary value of 1.

NAND gate 83 has two inputs which are connected to receive the ABS and PB signals and has an output on which it produces as SD1 signal. For the major portion of the time, the ABS signal has a binary value of 0; therefore, the SD1 signal normally has a binary value of 1. Each time a pulse occurs in the PB waveform at a time when the ABS signal has a binary value of 1, an inverted pulse occurs in the SD1 waveform.

NAND gate 84 has two inputs which are connected to receive the ABD and PA signals and has an output on which it produces an SD2 signal. As with the SD1 signal, the SD2 signal has a binary value of 1 for the major portion of the time, but each time a pulse occurs in the PA waveform an inverted pulse occurs in the SD2 waveform.

In latch circuit 86, NAND gate 88, which produces the D signal, is connected to receive the SD1 and SD2 signals as inputs. Anytime such an inverted pulse occurs in either the SD1 waveform or in the SD2 waveform, the D signal is forced to have a binary value of 1. In other words, the inverted pulses in the SD1, and SD2 waveforms serve as set signals for the latch circuit.

Figure 5:
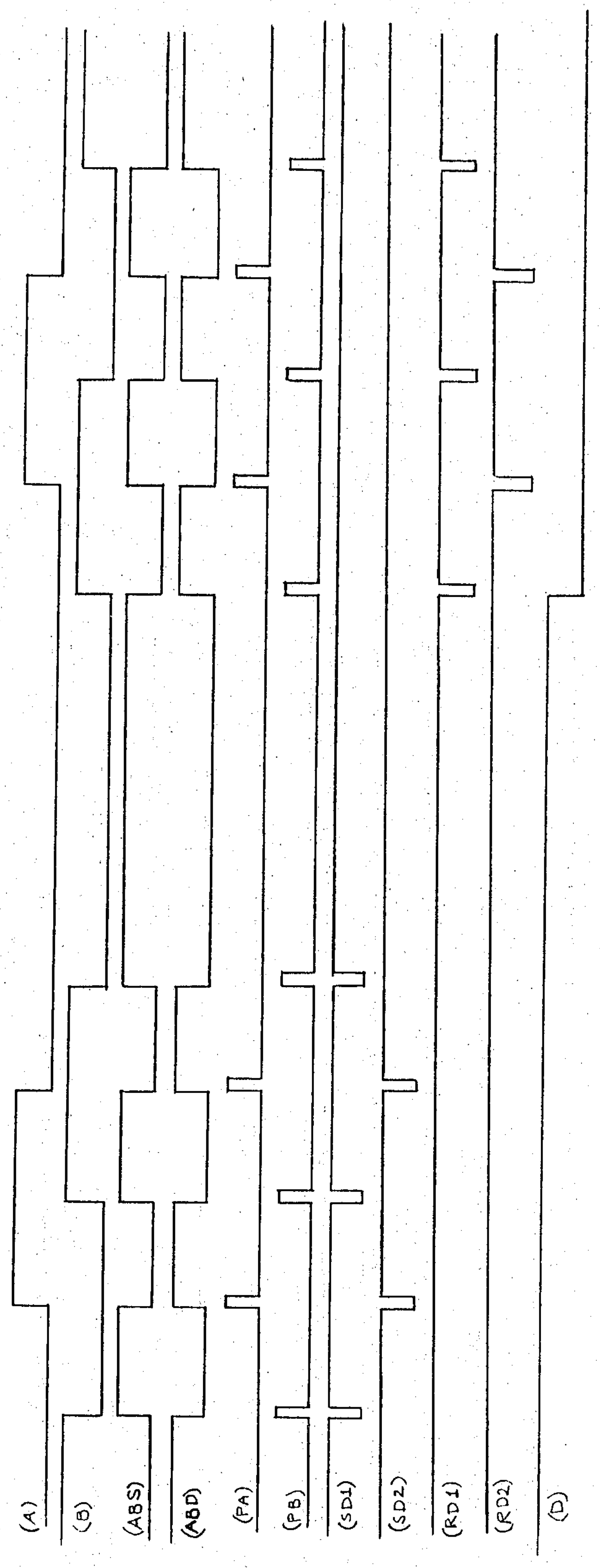
FIG. 5 is a timing diagram illustrating an example of operation of the position indicating apparatus.

In the examples illustrated in FIG. 5, the shaft rotates clockwise initially and accordingly, the latch circuit is set and the D signal assumes a binary value of 1. When the shaft stops, the latch circuit exhibits memory and the D signal does not change its binary value, which in this example is 1.

When the shaft reverses direction to rotate rotate counterclockwise, as can be seen in FIG. 5, each pulse in the PB waveform occurs while the ABD signal has a binary value of 1. And, each pulse in the PA waveform occurs while the ABS signal has a binary value of 1.

NAND gate 81 has two inputs which are connected to receive the ABD and PB signals and has an output on which it produces an RD1 signal. For the major portion of the time, the PB signal has a binary value of 0; therefore, the RD1 signal normally has a binary value of 1. Each time that a pulse occurs in the PB waveform at a time when the ABD signal has a binary value of 1 an inverted pulse occurs in the RD1 waveform.

NAND gate 82 has two inputs which are connected to receive the ABS and PA signals and has an output on which it produce an RD2 signal. As with the RD1 signal, the produces signal has a binary value of 1 for the major portion of the time, but each time a pulse occurs in the PA waveform, an inverted pulse occurs in the RD2 waveform.

NAND gate 87, which produces a DP signal used in the cross-coupled arrangement of the latch circuit 86, has two inputs which are connected to receive the RD1 and RD2 signals as inputs. Any time such an inverted pulse occurs in either the RD1 waveform or in the RD2 waveform, the DP signal is forced to have a binary value of 1. By virtue of the cross coupling in the latch circuit, this in turn forces the D signal to have a binary value of 0. In other words, the inverted pulses in the RD1 and RD2 waveforms serve as reset signals for the latch circuit.

What is claimed is:

1. Apparatus for forming pulses, which comprises:

a source of first and second time-varying, binary-valued data signals that each have transitions between opposite binary values;

first and second bistable circuits each having an output for providing a respective one of the first and second binary-valued gating control signals and each having an input for receiving a respective one of first and second trigger signals, the bistable circuits to respond to the trigger signals such that the first and second binary-valued gating control signals change between opposite binary values in accordance with but no sooner than a predetermined delay after the transitions of the first and second data signals respectively;

means for producing third and fourth gating control signals that indicate respectively whether or not the first and second gating control signals have changed in accordance with the respective data signal;

means enabled and disabled by the fourth gating control signal in accordance with the indication provided thereby for forming, in response to a transition of the first data signal but no sooner than a predetermined delay after a transition of the second data signal, a pulse as a trigger signal to the first bistable circuit; and means enabled and disabled by the third gating control signal in accordance with the indication provided thereby for forming, in response to a transition of the second data signal but no sooner than a predetermined delay after a transition of the first data signal, a pulse as a trigger signal to the second bistable circuit, whereby a pulse is formed each time either the first or second data signal has a transition in binary value at a time when the other data signal does not have a transition in binary value.

2. Apparatus according to claim 1 further comprising means for logically combining the pulses together to provide a single pulse train having one pulse each time either the first or second data signal has a transition in binary value.

3. Apparatus according to claim 2 wherein the source includes means for producing the first and second data signals such that they define a multi-phase signal which is in a first phase when each transition in binary value of the first data signal causes it to assume the same binary value as the second data signal and which is in a second phase when each transition in binary value of the first data signal causes it to assume the opposite binary value from the second data signal.

4. Apparatus according to claim 2 including means for delaying the forming of a pulse as one trigger signal until at least a minimum predetermined amount of time has elapsed from the forming of a pulse as the other trigger signal to insure that the pulses do not overlap in time so that the logical combining means can distinguish between the pulses.

5. Apparatus according to claim 4 wherein the source includes an incremental shaft position encoder for generating the time-varying, binary-valued data signals.

6. Apparatus according to claim 1 wherein each bistable circuit includes at least one control input and has an output providing complementary output signals serving as a different one of the first and second binary-valued control signals, at least one of the complementary signals being applied to a bistable circuit control input to enable it to toggle back-and-forth between states in response to a sequence of pulses occurring in its trigger signal.

7. Apparatus according to claim 6 wherein the means for producing the third and fourth gating control signals include a plurality of logical gating circuits each for producing one of the third and fourth gating control signals as an exclusive-OR logical gating function of one of the complementary signals and one of the data signals.

8. Position indicating apparatus comprising:

an incremental shaft position encoder having a shaft whose position is to be indicated and providing a multi-phase signal including two data signals that each switch back-and-forth between opposite binary values in response to rotation of the shaft, the phase of the multi-phase signal being indicative of the direction of rotation of the shaft;

transition detecting means for detecting transitions between binary values of the data signals, which includes two pulse forming networks each being connected to receive a different one of the two data signals as an input signal for the network and each including a bistable circuit triggerable to switch between opposite states and gating means to trigger it, the gating means being respectively enabled and disabled by opposite binary values of a control signal supplied thereto by the other network to form a trigger pulse for triggering the bistable circuit when the input signal switches between binary values, and further including gating means responsive to the state of the bistable circuit and the input signal for producing and supplying as the control signal to the other network a signal having opposite binary values in accordance with whether the bistable circuit has switched states in response to a trigger pulse, whereby a trigger pulse is formed each time either data signal switches at a time that the other data signal does not switch;

phase detecting means for detecting and indicating which phase of the multi-phase signal is in; and means, including an up/down counting register, responsive to the transition and phase detecting means for accumulating a count of the trigger pulses formed so that the accumulated count represents the net rotation of the shaft.

* * * * *